US008818805B2

(12) United States Patent
Namba et al.

(10) Patent No.: US 8,818,805 B2

(45) Date of Patent: Aug. 26, 2014

(54) SOUND PROCESSING APPARATUS, SOUND PROCESSING METHOD AND PROGRAM

(75) Inventors: Ryuichi Namba, Tokyo (JP); Mototsugu Abe, Kanagawa (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1324 days.

(21) Appl. No.: 12/611,909

(22) Filed: Nov. 3, 2009

(65) Prior Publication Data

US 2010/0111329 A1 May 6, 2010

(30) Foreign Application Priority Data

Nov. 4, 2008 (JP) ................................ P2008-283069

(51) Int. Cl.

*G10L 15/00* (2013.01)
*H04R 29/00* (2006.01)
*G10L 21/0208* (2013.01)

(52) U.S. Cl.

CPC .... *H04R 29/006* (2013.01); *G10L 2021/02087* (2013.01)
USPC .......................................................... 704/233

(58) Field of Classification Search

CPC .............. G10L 21/0272; G10L 21/028; G10L 21/0308; G10L 2021/02087; H04R 29/006
See application file for complete search history.

(56) References Cited

U.S. PATENT DOCUMENTS

2008/0175407 A1 * 7/2008 Zhang et al. .................... 381/92

FOREIGN PATENT DOCUMENTS

| | | |
|---|---|---|
| JP | 02-277308 | 11/1990 |
| JP | 08-316751 | 11/1996 |
| JP | 2002-099297 | 4/2002 |
| JP | 2004-304560 | 10/2004 |
| JP | 2006-178314 | 7/2006 |
| JP | 2006-211570 | 8/2006 |
| JP | 2008-197577 | 8/2008 |
| JP | 2008-258808 | 10/2008 |

* cited by examiner

*Primary Examiner* — Duc Nguyen
*Assistant Examiner* — Kile Blair
(74) *Attorney, Agent, or Firm* — Finnegan, Henderson, Farabow, Garrett & Dunner, L.L.P.

(57) ABSTRACT

A sound processing apparatus is provided. The apparatus includes an input correction unit that corrects a difference between characteristics of a first input sound input from a first input apparatus and characteristics of a second input sound input from a second input apparatus. The apparatus further includes a sound separation unit that separates the first input sound corrected by the input correction unit and the second input sound into a plurality of sounds. The apparatus further includes a sound type estimation unit that estimates sound types of the plurality of sounds. The apparatus further includes a mixing ratio calculation unit that calculates a mixing ratio of each sound in accordance with the estimated sound type. The apparatus further includes a sound mixing unit that mixes the plurality of sounds separated by the sound separation unit in the mixing ratio calculated by the mixing ratio calculation unit.

14 Claims, 9 Drawing Sheets

SOUND PROCESSING APPARATUS, SOUND PROCESSING METHOD AND PROGRAM

BACKGROUND OF THE INVENTION

1. Field of the Invention

The present invention relates to a sound processing apparatus, a sound processing method, and a program, and in particular, relates to a sound processing apparatus that adjusts a sound by utilizing a call microphone as an imaging microphone, a sound processing method, and a program.

2. Description of the Related Art

In recent years, a communication apparatus such as a mobile phone is increasingly equipped with an imaging application function. If a communication apparatus is equipped with an imaging function, the communication apparatus is equipped with a call microphone and an imaging microphone. These microphones are used independently of each other in such a way that the call microphone is used when a call is made, and the imaging microphone is used during imaging.

However, if the call microphone is used as well as the imaging microphone during imaging, quality of imaging sound can be improved. If, for example, the imaging microphone is monophonic, quality improvements such as sound source separation using spatial transfer characteristics between microphones can newly be achieved. If the imaging microphone is stereophonic, functionalization improvements by determining the sound source direction more precisely can be achieved by further sound source separation.

For example, a method of emphasizing a call voice only by separating a sound originating from a plurality of sound sources can be considered. As a method of emphasizing a sound, a method of separating a music signal consisting of a plurality of parts into each part and emphasizing an important part before remixing the separated sound can be considered (for example, Japanese Patent Application Laid-Open No. 2002-236499).

SUMMARY OF THE INVENTION

However, Japanese Patent Application Laid-Open No. 2002-236499 is intended for a music signal and is not a technology for an imaging sound. There is also an issue that frequently characteristics of a call microphone are significantly different from those of an imaging microphone and arrangement of each microphone is not necessarily optimized for improvement of quality of a call voice.

The present invention has been made in view of the above issues and it is desirable to provide a novel and improved sound processing apparatus capable of separating a mixed sound originating from various sound sources and remixing separated sounds in a desired ratio using microphones having different characteristics, a sound processing method, and a program.

According to an embodiment of the present invention, there is provided a sound processing apparatus including an input correction unit that corrects a difference between characteristics of a first input sound input from a first input apparatus and characteristics of a second input sound input from a second input apparatus that are different from the characteristics of the first input sound, a sound separation unit that separates the first input sound corrected by the input correction unit and the second input sound into a plurality of sounds, a sound type estimation unit that estimates sound types of the plurality of sounds separated by the sound separation unit, a mixing ratio calculation unit that calculates a mixing ratio of each sound in accordance with the sound type estimated by the sound type estimation unit, and a sound mixing unit that mixes the plurality of sounds separated by the sound separation unit in the mixing ratio calculated by the mixing ratio calculation unit.

According to the above configuration, a difference between characteristics of the first input sound input from the first input apparatus of the sound processing apparatus and those of the second input sound input from the second input apparatus is corrected. The first input sound whose input is corrected and the second input sound are separated into sounds caused by a plurality of sound sources and a plurality of separated sound types. Then, a mixing ratio of each sound is calculated in accordance with the estimated sound type and each separated sound is remixed in the mixing ratio. Then, a call voice is extracted from the first input sound whose characteristics have been corrected using a mixed sound after being remixed.

Accordingly, a mixed sound originating from various sound sources can be separated before being remixed in a desired ratio by utilizing the first apparatus as a second apparatus. Moreover, sound recorded in various situations by additionally using a call microphone in addition to an imaging microphone during imaging by the sound processing apparatus equipped with an imaging apparatus can comfortably be heard continuously without any volume operation by the user.

The first input apparatus may be a call microphone and the second input apparatus may be an imaging microphone.

The input correction unit may set a flag to a band where characteristics of the call microphone and/or the imaging microphone are inadequate, and the sound separation unit may do not separate the sound of the band to which the flag is set by the input correction unit.

The input correction unit may correct frequency characteristics and/or a dynamic range of the first input sound and/or the second input sound.

The input correction unit may perform sampling rate conversions of the first input sound and/or the second input sound.

The input correction unit may correct a difference of delay between the first input sound and the second input sound due to A/D conversions.

An identity determination unit that determines whether the sounds separated by the sound separation unit are identical among a plurality of blocks and a recording unit that records the sounds separated by the sound separation unit in units of blocks may be included.

The sound separation unit may separate the input sound into a plurality of sounds using statistical independence of sound and differences in spatial transfer characteristics.

The sound separation unit may separate the input sound into a sound originating from a specific sound source and other sounds using a paucity of overlapping between time-frequency components of sound sources.

The sound type estimation unit may estimate whether the input sound is a steady sound or non-steady sound using a distribution of amplitude information, direction, volume, zero crossing number and the like at discrete times of the input sound.

The sound type estimation unit may estimate whether the sound estimated to be a non-steady sound is a noise sound or a voice uttered by a person.

The mixing ratio calculation unit may calculate a mixing ratio that does not significantly change the volume of the sound estimated to be a steady sound by the sound type estimation unit.

The mixing ratio calculation unit may calculate a mixing ratio that lowers the volume of the sound estimated to be a noise sound by the sound type estimation unit and may do not lower the volume of the sound estimated to be a voice uttered by a person.

According to another embodiment of the present invention, there is provided a sound processing method including the steps of correcting a difference between characteristics of a first input sound input from a first input apparatus and characteristics of a second input sound input from a second input apparatus that are different from the characteristics of the first input sound, separating the corrected first input sound and the second input sound into a plurality of sounds, estimating sound types of the plurality of separated sounds, calculating a mixing ratio of each sound in accordance with the estimated sound type, and mixing the plurality of separated sounds in the calculated mixing ratio.

According to another embodiment of the present invention, there is provided a program for causing a computer to function as a sound processing apparatus including an input correction unit that corrects a difference between characteristics of a first input sound input from a first input apparatus and characteristics of a second input sound input from a second input apparatus that are different from the characteristics of the first input sound, a sound separation unit that separates the first input sound corrected by the input correction unit and the second input sound into a plurality of sounds, a sound type estimation unit that estimates sound types of the plurality of sounds separated by the sound separation unit, a mixing ratio calculation unit that calculates a mixing ratio of each sound in accordance with the sound type estimated by the sound type estimation unit, and a sound mixing unit that mixes the plurality of sounds separated by the sound separation unit in the mixing ratio calculated by the mixing ratio calculation unit.

According to the present invention, as described above, a mixed sound originating from various sound sources can be separated before being remixed in a desired ratio using microphones having different characteristics.

DETAILED DESCRIPTION OF EMBODIMENT

Figure 1:
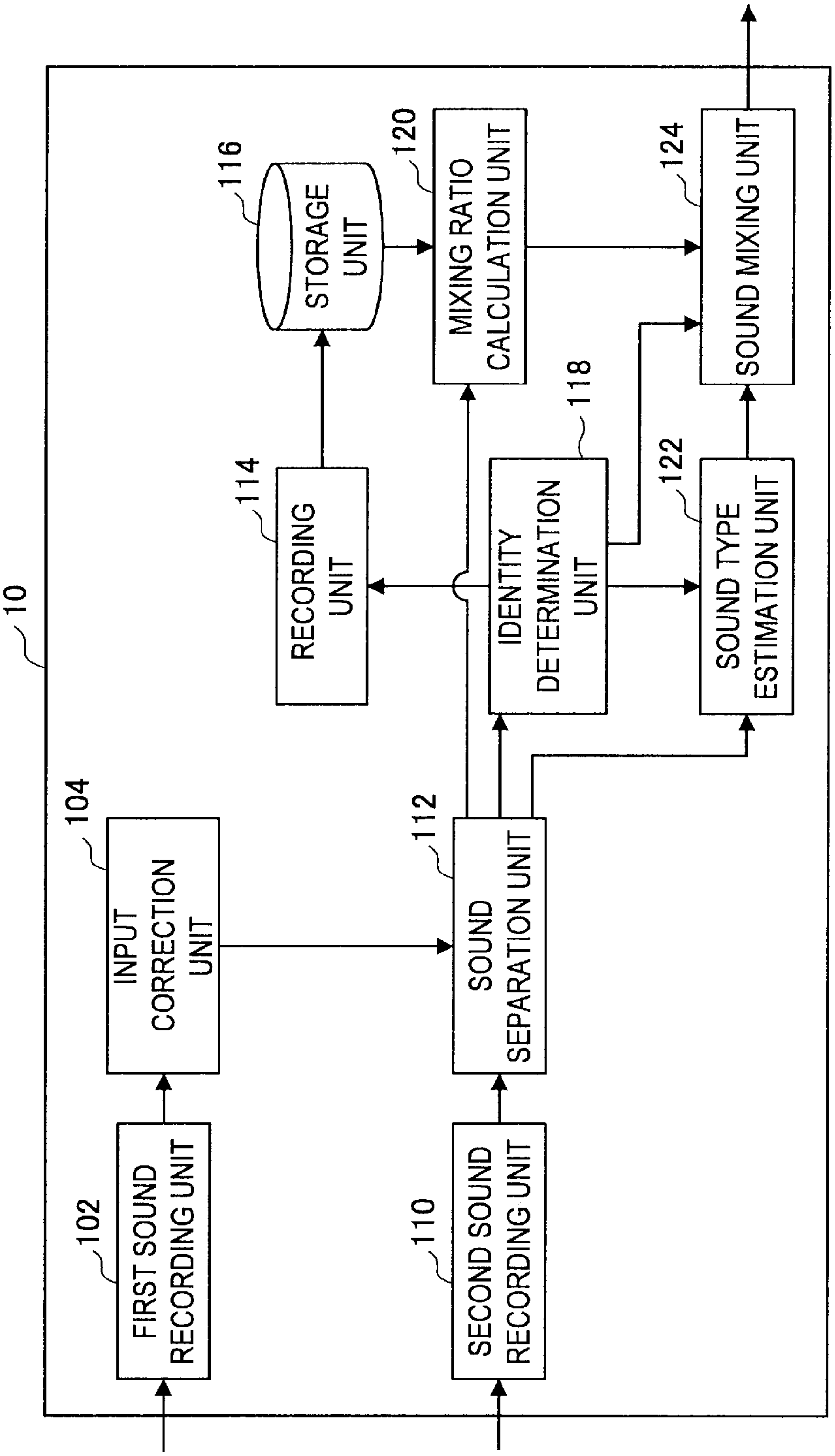
FIG. 1 is a block diagram showing a functional configuration of a sound processing apparatus according to an embodiment of the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

A "DETAILED DESCRIPTION OF EMBODIMENT" will be described in the order shown below:

[1] Purpose of the embodiment

[2] Functional configuration of the sound processing apparatus

[3] Operation of the sound processing apparatus

[1] Purpose of the Embodiment

First, the purpose of the embodiment will be described. In recent years, a communication apparatus such as a mobile phone is increasingly equipped with an imaging application function. If a communication apparatus is equipped with an imaging function, the communication apparatus is equipped with a call microphone and an imaging microphone. These microphones are used independently of each other in such a way that the call microphone is used when a call is made, and the imaging microphone is used during imaging.

However, if the call microphone is used as well as the imaging microphone during imaging, quality of imaging sound can be improved. If, for example, the imaging microphone is monophonic, functionalization improvements such as sound source separation using spatial transfer characteristics between microphones can newly be sought. If the imaging microphone is stereophonic, functionalization improvements by determining the sound source direction more precisely can be achieved by further sound source separation.

However, there is an issue that frequently characteristics of a call microphone are significantly different from those of an imaging microphone and arrangement of each microphone is not necessarily optimized for improvement of quality of a call voice. Thus, with the above situation being focused on, a sound processing apparatus 10 according to an embodiment of the present invention has been developed. According to the sound processing apparatus 10 in the present embodiment, a mixed sound originating from various sound sources can be separated before being remixed in a desired ratio by utilizing a call microphone as an imaging microphone.

[2] Functional Configuration of the Sound Processing Apparatus

Next, the functional configuration of the sound processing apparatus 10 will be described with reference to FIG. 1. As the sound processing apparatus 10 according to the present embodiment, for example, a mobile phone having a communication function and imaging function can be exemplified. When an image is picked up using a mobile phone having a communication function and imaging function or the like, frequently a sound originating from a desired sound source is not recorded in an appropriate volume balance intended by an operator of the imaging apparatus because the sound originating from the desired sound source is masked by sounds originating from other sound sources. Moreover, if sounds recorded in various situations such as when moving or discontinuously are reproduced, each recorded volume level may fluctuate greatly so that it is frequently difficult to listen to sound comfortably at a fixed reproduction volume. However, according to the sound processing apparatus 10 in the present embodiment, it becomes possible to adaptively adjust the volume balance between sound sources and also to adjust the volume level of a plurality of recording materials by using a call microphone in addition to an imaging microphone to detect presence of a plurality of sound sources.

FIG. 1 is a block diagram showing the functional configuration of the sound processing apparatus 10 in the present embodiment. As shown in FIG. 1, the sound processing apparatus 10 includes a first sound recording unit 102, an input correction unit 104, a second sound recording unit 110, a sound separation unit 112, a recording unit 114, a storage unit 116, an identity determination unit 118, a mixing ratio calculation unit 120, a sound type estimation unit 122, and a sound mixing unit 124.

The first sound recording unit 102 has a function to record sound and to discretely quantize the recorded sound. The first sound recording unit 102 is an example of a first input apparatus of the present invention and, for example, a call microphone. The first sound recording unit 102 contains two or more physically separated recording units (for example, microphones). The first sound recording unit 102 may contain two recording units, one for recording a left sound and the other for recording a right sound. The first sound recording unit 102 provides the discretely quantized sound to the input correction unit 104 as an input sound. The first sound recording unit 102 may provide the input sound to the input correction unit 104 in units of blocks of a predetermined length.

The input correction unit 104 has a function to correct characteristics of the call microphone having different characteristics. That is, a difference between characteristics of a first input sound (call voice) input from the call microphone, which is the first input apparatus, and those of a second input sound (sound during imaging) input from the imaging microphone, which is the second input apparatus, is corrected. Correcting an input sound is, for example, to perform rate conversions when a sampling frequency is different from that of the other microphone and to apply inverse characteristics of frequency characteristics when frequency characteristics are different. If the amount of delay due to A/D conversion and the like is different, the amount of delay may be corrected.

Figure 2:
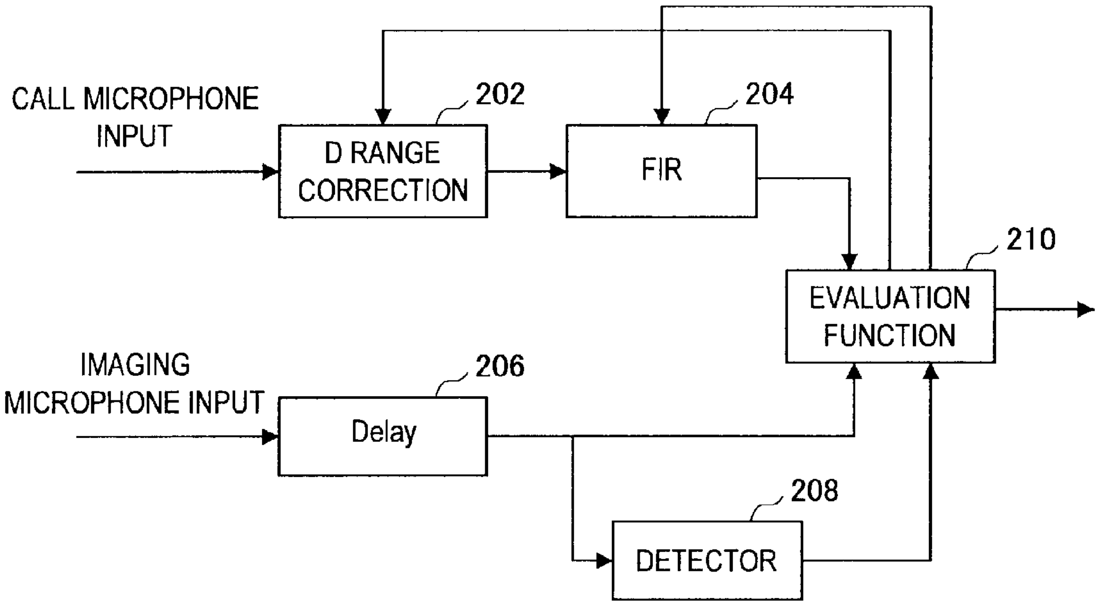
FIG. 2 is an explanatory view illustrating an example of correction by an input correction unit according to the embodiment.

Here, an example of correction by the input correction unit 104 will be described with reference to FIG. 2. FIG. 2 is an explanatory view illustrating an example of correction by the input correction unit 104. As shown in FIG. 2, an interval (interval in which a single sound source dominates) in which only a call voice is predominantly input into the imaging microphone, which is the second input apparatus, and also a call voice of a sufficient volume is input into the call microphone, which is the first input apparatus, is detected by a detector 208.

Here, it is assumed that phases of the imaging microphone and call microphone are aligned by applying Delay to one of the microphones. Further, it is assumed that, for example, a difference or square error between output after applying a dynamic range conversion and FIR filter to call microphone input and imaging microphone input is set as an evaluation function. Then, characteristics of both microphone inputs are aligned by adaptively updating the FIR filter coefficient and the inclination of a dynamic range conversion curve so that the evaluation function is minimized.

At this point, the input correction unit 104 may set a flag to an applicable band if adequate characteristics are not obtained as a result of correction or microphone characteristics are originally inadequate. Separation processing by the sound separation unit 112 described later may not be performed on a band to which the flag is set.

Figure 3:
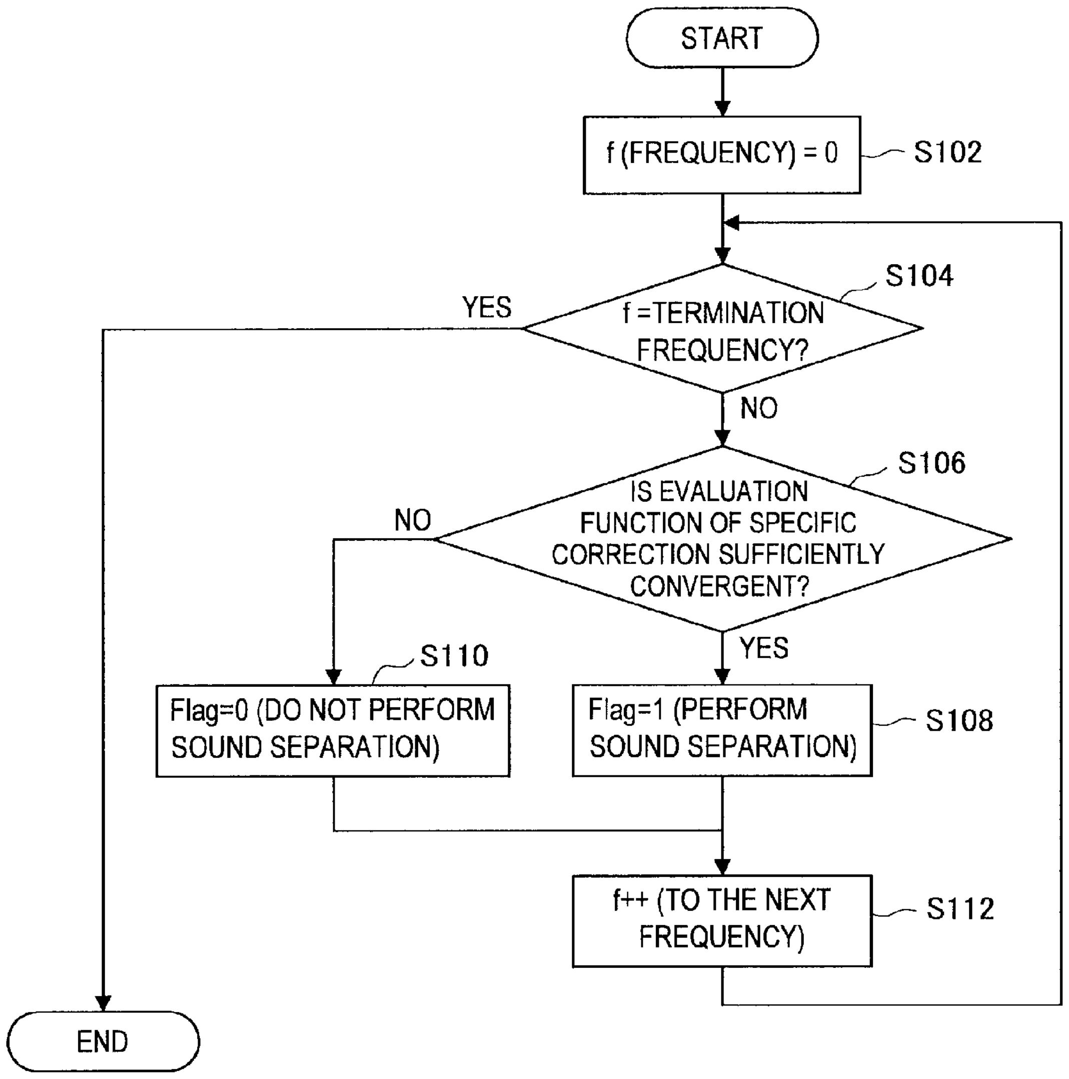
FIG. 3 is a flow chart showing flag setting processing by the input correction unit according to the embodiment.

Here, a flag setting by the input correction unit 104 will be described with reference to FIG. 3. FIG. 3 is a flow chart showing flag setting processing by the input correction unit 104. As shown in FIG. 3, first the first frequency block (frequency f) is set to 0 (S 102).

Next, it is determined whether the frequency f is the termination frequency (S104). If the frequency f is the termination frequency at step S104, processing is terminated. If the frequency f is not the termination frequency at step S104, it is determined whether the evaluation function of specific correction is sufficiently convergent (S106). That is, it is determined whether adequate characteristics are obtained as a result of correction by the input correction unit 104.

If it is determined at step S106 that the evaluation function of specific correction is sufficiently convergent, the flag (Flag) is set to 1 (S108). In this case, sound separation processing is performed. On the other hand, if it is determined at step S106 that the evaluation function of specific correction is not sufficiently convergent, the flag (Flag) is set to 0 (S110). In this case, sound separation processing is not performed. Then, the block of the next frequency (f++) is processed (S112).

Returning to FIG. 1, the second sound recording unit 110 has a function to record sound and to discretely quantize the recorded sound. The second sound recording unit 110 is an example of the second input apparatus of the present invention and, for example, an imaging microphone. The second sound recording unit 110 contains two or more physically separated recording units (for example, microphones). The second sound recording unit 110 may contain two recording units, one for recording a left sound and the other for recording a right sound. The second sound recording unit 110 provides the discretely quantized sound to the sound separation unit 112 as an input sound. The second sound recording unit 110 may provide the input sound to the sound separation unit 112 in units of blocks of a predetermined length.

The sound separation unit 112 has a function to separate the input sound into a plurality of sounds originating from a plurality of sound sources. More specifically, the input sound provided by the second sound recording unit 110 is separated using statistical independence of sound sources and differences in spatial transfer characteristics. As described above, when the input sound is provided from the second sound recording unit 110 in units of blocks of a predetermined length, the sound may be separated in units of the blocks.

As a concrete technique to separate sound sources by the sound separation unit 112, for example, a technique using the independent component analysis (article 1: Y. Mori, H. Saruwatari, T. Takatani, S. Ukai, K. Shikano, T. Hietaka, T. Morita, Real-Time Implementation of Two-Stage Blind Source Separation Combining SIMO-ICA and Binary Masking, Proceedings of IWAENC2005, (2005).) may be used. A technique that uses a paucity of overlapping between time-frequency components of sound (article 2: O. Yilmaz and S. Richard, Blind Separation of Speech Mixtures via Time-Frequency Masking, IEEE TRANSACTIONS ON SIGNAL PROCESSING, VOL. 52, NO. 7, JULY (2004).) may also be used.

If spatial aliasing caused by arrangement of microphones occurs at higher frequencies, sound may be separated by using sound source direction information at lower frequencies where spatial aliasing does not occur and a difference of path to each microphone of sound from the sound source direction. Sound separation processing may not be performed on the aforementioned band with inadequate characteristics to which a flag is set by the input correction unit 104. In this case, corrections are made by the input correction unit 104 using sound source direction information obtained based on separated sounds of bands adjacent to the band to which a flag is set.

The identity determination unit 118 has a function, when an input sound is separated into a plurality of sounds in units of blocks by the sound separation unit 112, to determine whether the separated sounds are identical among a plurality of blocks. The identity determination unit 118 determines whether separated sounds between consecutive blocks originate from the same sound source using, for example, the distribution of amplitude information, volume, direction information and the like at discrete times of separated sounds provided by the sound separation unit 112.

The recording unit 114 has a function to record volume information of sounds separated by the sound separation unit in the storage unit 116 in units of blocks. Volume information recorded in the storage unit 116 includes, for example, sound type information of each separated sound acquired by the identity determination unit 118 and the average value, maximum value, variance and the like of separated sounds acquired by the sound separation unit 112. In addition to real-time sound, the average value of volume of separated sounds on which sound processing was performed in the past may be recorded. If volume information of input sound is available prior to the input sound, the volume information may be recorded.

The sound type estimation unit 122 has a function to estimate the sound type of a plurality of sounds separated by the sound separation unit 112. The sound type (steady or non-steady, noise or sound) is estimated, for example, from sound information obtained from the volume of separated sound and the distribution, maximum value, average value, variance, zero crossing number and the like of amplitude information, and direction distance information. Here, detailed functions of the sound type estimation unit 122 will be described. A case in which the sound processing apparatus 10 is mounted in an imaging apparatus will be described below. The sound type estimation unit 122 determines whether any sound originating from the neighborhood of the imaging apparatus such as a voice of an operator of the imaging apparatus or noise resulting from an operation of the operator is contained. Accordingly, by which sound source a sound is caused can be estimated.

Figure 4:
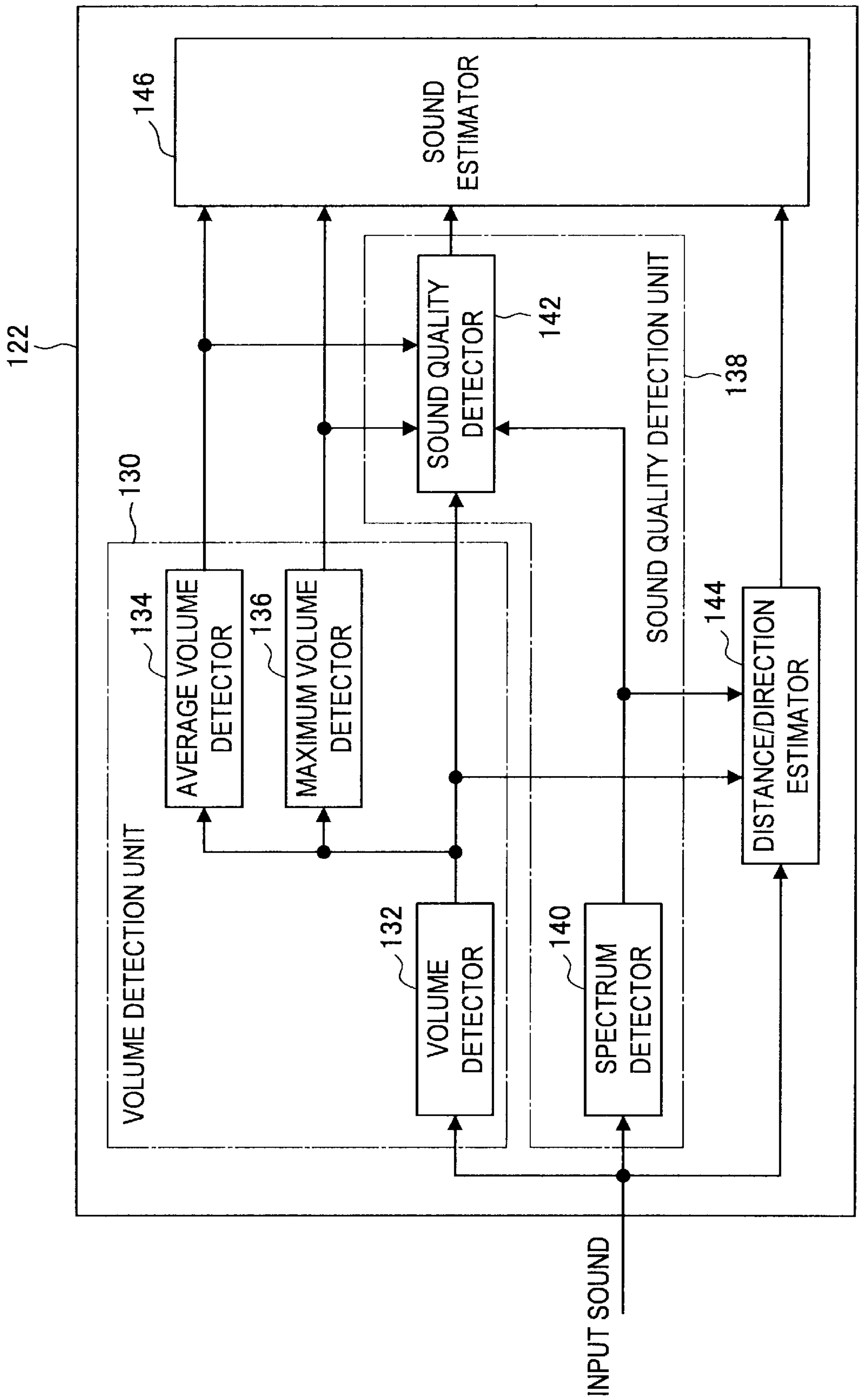
FIG. 4 is a functional block diagram showing the configuration of a sound type estimation unit according to the embodiment.

FIG. 4 is a functional block diagram showing the configuration of the sound type estimation unit 122. The sound type estimation unit 122 includes a volume detection unit 130 including a volume detector 132, an average volume detector 134, and a maximum volume detector 136, a sound quality detection unit 138 including a spectrum detector 140 and a sound quality detector 142, a distance/direction estimator 144, and a sound estimator 146.

The volume detector 132 detects a volume value sequence (amplitude) of input sound given in frames of a predetermined length (for example, several tens msec) and outputs the detected volume value sequence of input sound to the average volume detector 134, the maximum volume detector 136, the sound quality detector 142, and the distance/direction estimator 144.

The average volume detector 134 detects the average value of volume of input sound, for example, in frames based on the volume value sequence in frames input from the volume detector 132. The average volume detector 134 outputs the detected average value of volume to the sound quality detector 142 and the sound estimator 146.

The maximum volume detector 136 detects the maximum value of volume of input sound, for example, in frames based on the volume value sequence in frames input from the volume detector 132. The maximum volume detector 136 outputs the detected maximum value of volume of input sound to the sound quality detector 142 and the sound estimator 146.

The spectrum detector 140 detects each spectrum in the frequency domain of input sound by performing, for example, FFT (Fast Fourier Transform) on the input sound. The spectrum detector 140 outputs detected spectra to the sound quality detector 142 and the distance/direction estimator 144.

The sound quality detector 142 has an input sound, average value of volume, maximum value of volume, and spectrum input thereinto, detects a likeness of human voice, that of music, steadiness, and impulse property of the input sound, and outputs detection results to the sound estimator 146. The likeness of human voice may be information indicating whether a portion or all of the input sound matches human voice or to which extent the input sound resembles human voice. Also, the likeness of music may be information indicating whether a portion or all of the input sound matches music or to which extent the input sound resembles music.

Steadiness indicates, for example, like an air-conditioning sound, a property whose statistical property of sound does not change significantly over time. The impulse property indicates, for example, like a blow sound or plosive, a property full of noise in which energy is concentrated in a short period of time.

The sound quality detector 142 can detect, for example, a likeness of human voice based on the degree of matching of the spectral distribution of input sound and that of human voice. The sound quality detector 142 may also detect a higher impulse property with an increasing maximum value of volume by comparing maximum values of volume of each frame or other frames.

The sound quality detector 142 may analyze sound quality of input sound using signal processing technology such as the zero crossing method and LPC (Linear Predictive Coding) analysis. According to the zero crossing method, a fundamental period of input sound is detected and therefore, the sound quality detector 142 may detect a likeness of human voice based on whether the fundamental period is contained in the fundamental period (for example, 100 to 200 Hz) of human voice.

The distance/direction estimator 144 has an input sound, volume value sequence of the input sound, spectrum of the input sound and the like input thereinto. The distance/direction estimator 144 has a function, based on the input, as a positional information calculation unit that estimates the sound source of the input sound or positional information such as direction information and distance information of the sound source from which a dominant sound contained in the input sound originates. The distance/direction estimator 144 can collectively estimate the position of the sound source even if a reverberation or the reflection of sound caused by the main body of imaging apparatus has a great influence by combining the phase, volume, and volume value sequence of input sound and estimation methods of positional information of the sound source based on the average volume value and maximum volume value in the past. An example of the estimation method of the direction information and distance information by the distance/direction estimator 144 will be described with reference to FIGS. 5 to 8.

Figure 5:
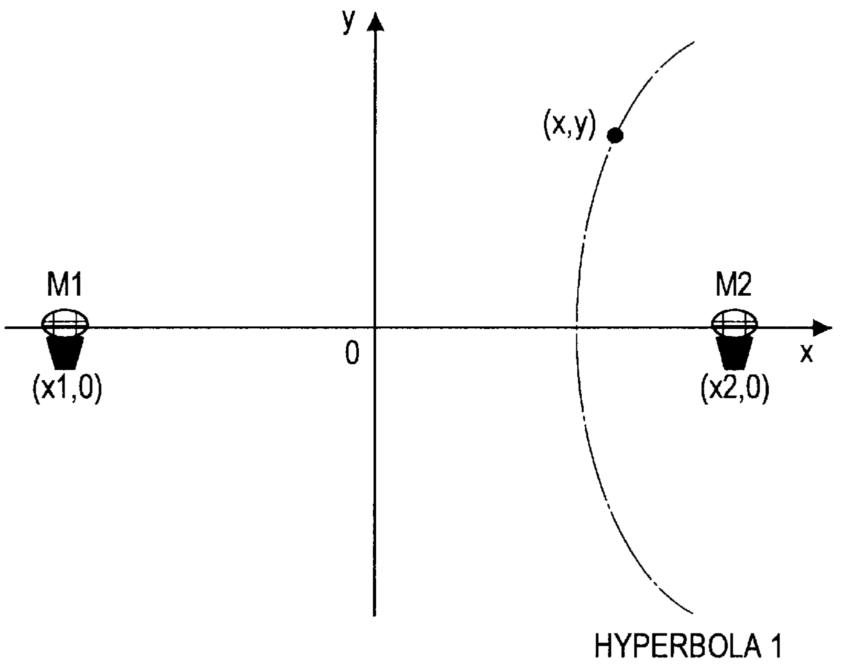
FIG. 5 is an explanatory view showing a state that a sound source position of input sound is estimated based on a phase difference of two input sounds.

FIG. 5 is an explanatory view showing a state that the sound source position of an input sound is estimated based on a phase difference of two input sounds. If the sound source is assumed to be a point sound source, the phase of each input sound reaching a microphone M1 and a microphone M2 constituting the sound recording unit 110 and a phase difference of the input sounds can be measured. Further, a difference between the distance from the microphone M1 to the sound source position of input sound and that from the microphone M2 can be calculated from the phase difference and values of a frequency f and a sound velocity c of the input sound. The sound source is present on a set of points where the difference of distance is constant. It is known that such a set of points where the difference of distance is constant forms a hyperbola.

It is assumed, for example, that the microphone M1 is positioned at (x1, 0) and the microphone M2 at (x2, 0) (generality is not lost under this assumption). If a point on a set of the sound source position to be determined is at (x, y) and the difference of distance is d, Formula 1 shown below holds:

[Equation 1]

$$\sqrt{(x-x_1)^2+y^2}-\sqrt{(x-x_2)^2+y^2}=d \quad \text{(Formula 1)}$$

Further, Formula 1 can be expanded into Formula 2, from which Formula 3 representing a hyperbola is derived:

[Equation 2]

$$\{(x-x_1)^2+2y^2+(x-x_2)^2-d^2\}^2=4\{(x-x_1)^2+y^2\}\{(x-x_2)^2+y^2\} \quad \text{(Formula 2)}$$

[Equation 3]

$$\frac{\left(x-\frac{x_1+x_2}{2}\right)^2}{\left(\frac{d}{2}\right)^2}-\frac{y^2}{\left(\frac{1}{2}\right)^2}=1 \quad \text{(Formula 3)}$$

The distance/direction estimator 144 can also determine to which of the microphone M1 and the microphone M2 the distance/direction estimator 144 is closer based on a volume difference between input sounds recorded by the microphone M1 and the microphone M2. Accordingly, for example, as shown in FIG. 5, the sound source can be determined to be present on a hyperbola 1 closer to the microphone M2.

Incidentally, it is necessary for the frequency f of input sound used for calculation of a phase difference to satisfy a condition on a distance between the microphone M1 and the microphone M2 in Formula 4:

[Equation 4]

$$f<\frac{c}{2d} \quad \text{(Formula 4)}$$

Figure 6:
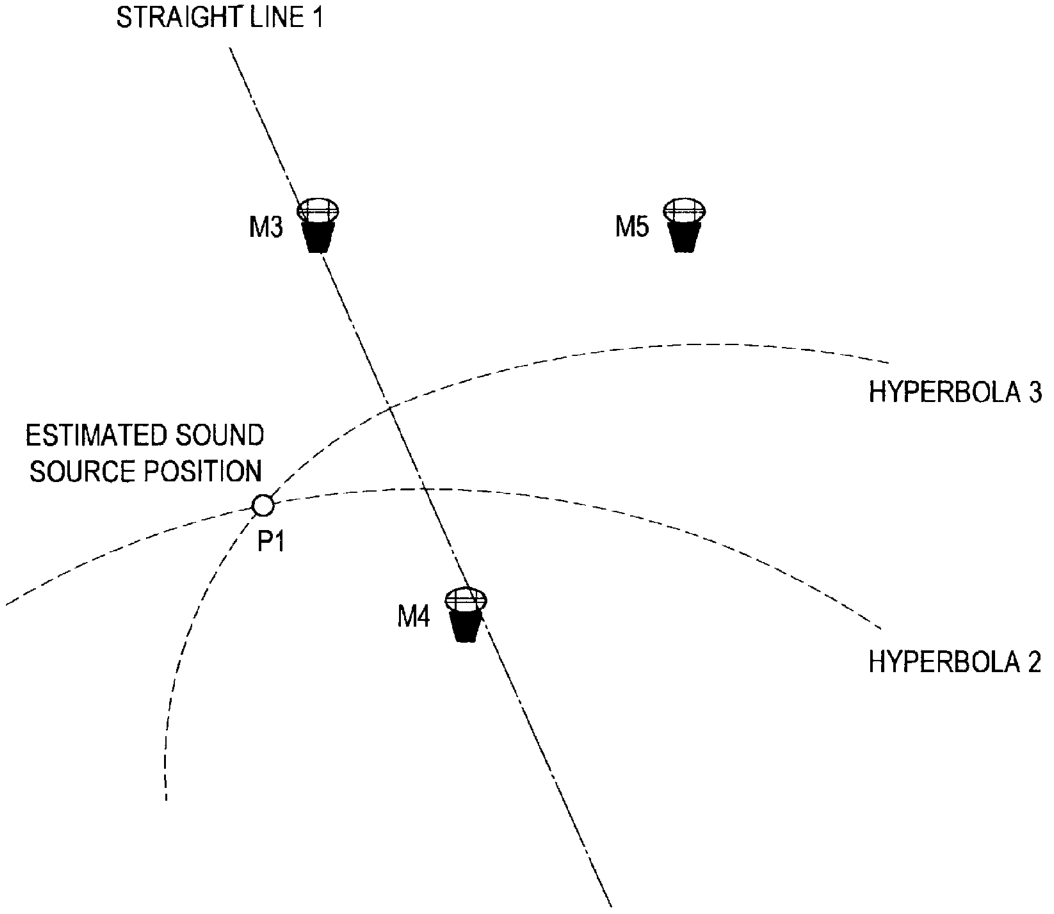
FIG. 6 is an explanatory view showing a state that a sound source position of input sound is estimated based on a phase difference of three input sounds.

FIG. 6 is an explanatory view showing a state that the sound source position of an input sound is estimated based on phase differences among three input sounds. Arrangement of a microphone M3, a microphone M4, and a microphone M5 constituting the second sound recording unit 110 as shown in FIG. 6 is assumed. The phase of input sound arriving at the microphone M5 may be delayed when compared with that of input sound arriving at the microphone M3 or the microphone M4. In such a case, the distance/direction estimator 144 can determine that the sound source is positioned on the opposite side of the microphone M5 with respect to a straight line 1 linking the microphone M3 and the microphone M4 (front/back determination).

Further, the distance/direction estimator 144 calculates a hyperbola 2 on which the sound source could be present based on a phase difference of input sounds arriving at each of the microphone M3 and the microphone M4. Then, the distance/direction estimator 144 can calculate a hyperbola 3 on which the sound source could be present based on a phase difference of input sounds arriving at each of the microphone M4 and the microphone M5. As a result, the distance/direction estimator 144 can estimate that an intersection P1 of the hyperbola 2 and the hyperbola 3 is the sound source position.

Figure 7:
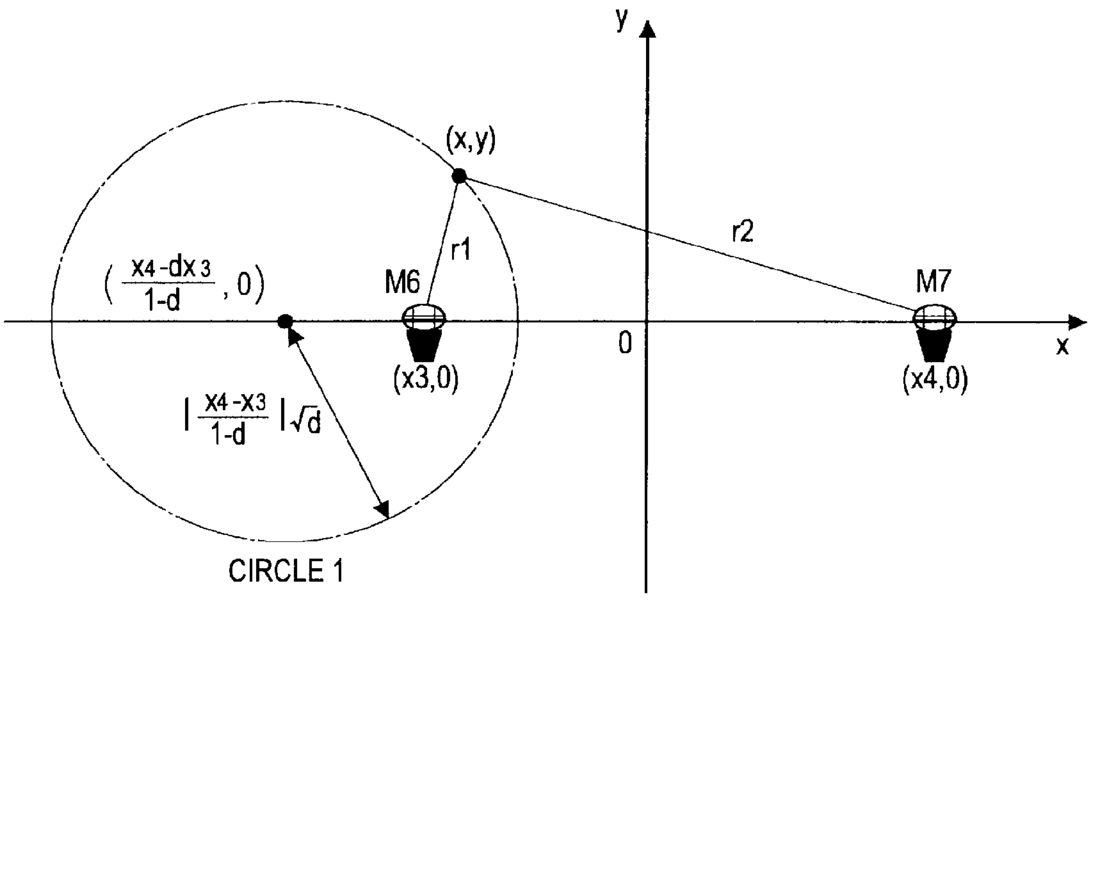
FIG. 7 is an explanatory view showing a state that a sound source position of input sound is estimated based on a volume of two input sounds.

FIG. 7 is an explanatory view showing a state that the sound source position of an input sound is estimated based on volumes of two input sounds. If the sound source is assumed to be a point sound source, the volume measured at a point is inversely proportional to the square of distance based on the inverse square law. If a microphone M6 and a microphone M7 constituting the second sound recording unit 110 as shown in FIG. 7 is assumed, a set of points where the ratio of volumes arriving at the microphone M6 and the microphone M7 is constant forms a circle. The distance/direction estimator 144 can determine the radius and the center position of the circle on which the sound source is present by determining the ratio of volume from values of volume input from the volume detector 132.

It is assumed, as shown in FIG. 7, that the microphone M6 is positioned at (x3, 0) and the microphone M7 at (x4, 0). In this case (generality is not lost under this assumption), if a point on a set of the sound source position to be determined is at (x, y), distances r1 and r2 from each microphone to the sound source can be expressed as Formula 5 below:

[Equation 5]

$$r_1=\sqrt{(x-x_3)^2+y^2}\; r_2=\sqrt{(x-x_4)^2+y^2} \quad \text{(Formula 5)}$$

Here, Formula 6 below holds thanks to the inverse square law:

[Equation 6]

$$\frac{1}{r_1^2}:\frac{1}{r_2^2}=\text{constant} \quad \text{(Formula 6)}$$

Formula 6 is transformed to Formula 7 using a positive constant d (for example, 4):

[Equation 7]

$$\frac{r_2^2}{r_1^2}=d \quad \text{(Formula 7)}$$

Formula 8 below is derived by substitution into r1 and r2 in Formula 7:

[Equation 8]

$$\frac{(x-x_4)^2+y^2}{(x-x_3)^2+y^2}=d \quad \text{(Formula 8)}$$

$$\left(x-\frac{x_4-dx_3}{1-d}\right)^2+y^2=\frac{d(x_4-x_3)^2}{(1-d)^2}$$

From Formula 8, the distance/direction estimator 144 can estimate that, as shown in FIG. 7, the sound source is present on a circle 1 whose center coordinates are represented by Formula 9 and whose radius is represented by Formula 10.

[Equation 9]

$$\left(\frac{x_4 - dx_3}{1 - d}, 0\right) \quad \text{(Formula 9)}$$

[Equation 10]

$$\left|\frac{x_4 - x_3}{1 - d}\right|\sqrt{d} \quad \text{(Formula 10)}$$

Figure 8:
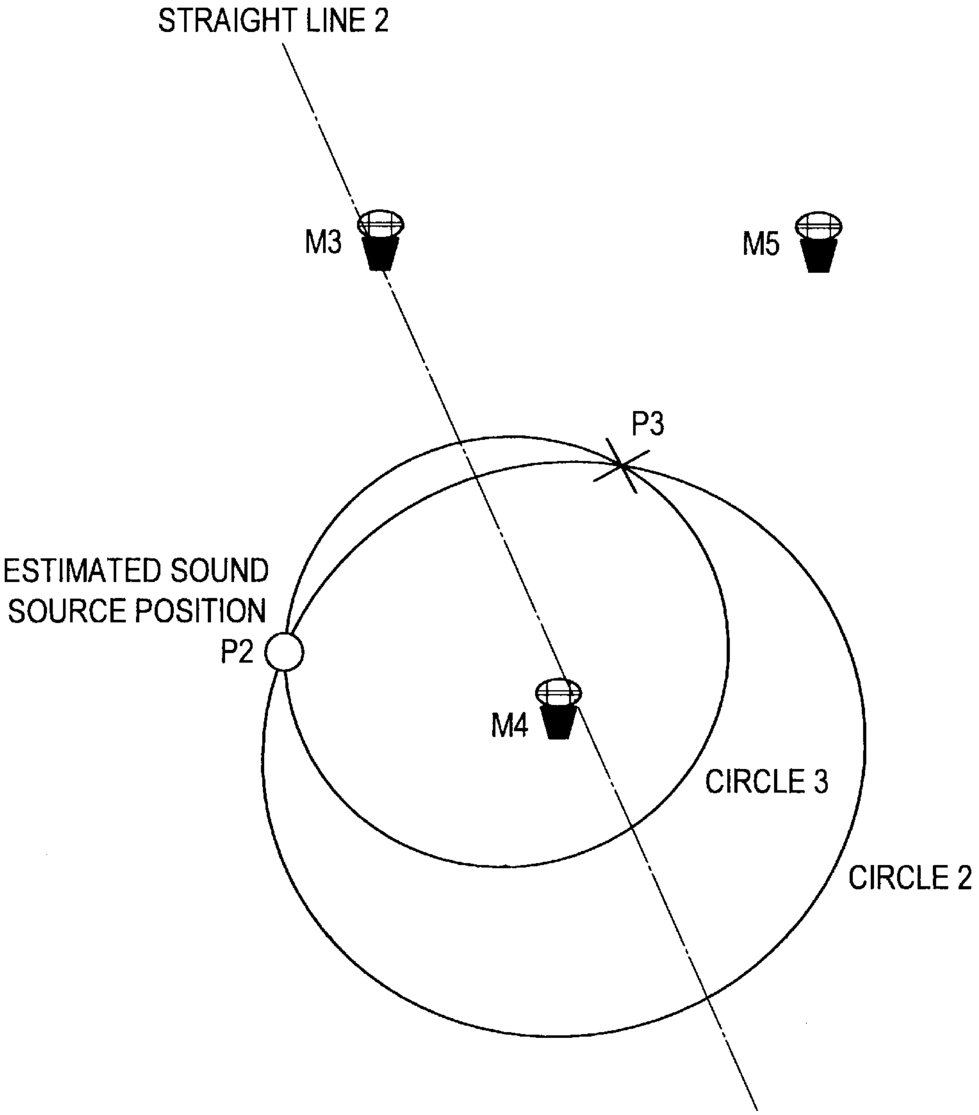
FIG. 8 is an explanatory view showing a state that a sound source position of input sound is estimated based on a volume of three input sounds.

FIG. 8 is an explanatory view showing a state that the sound source position of an input sound is estimated based on volumes of three input sounds.

Arrangement of the microphone M3, the microphone M4, and the microphone M5 constituting the second sound recording unit 110 as shown in FIG. 8 is assumed. The phase of input sound arriving at the microphone M5 may be delayed when compared with that of input sound arriving at the microphone M3 or the microphone M4. In such a case, the distance/direction estimator 144 can determine that the sound source is positioned on the opposite side of the microphone M5 with respect to a straight line 2 linking the microphone M3 and the microphone M4 (front/back determination).

Further, the distance/direction estimator 144 calculates a circle 2 on which the sound source could be present based on a volume ratio of input sounds arriving at each of the microphone M3 and the microphone M4. Then, the distance/direction estimator 144 can calculate a circle 3 on which the sound source could be present based on a volume ratio of input sounds arriving at each of the microphone M4 and the microphone M5. As a result, the distance/direction estimator 144 can estimate that an intersection P2 of the circle 2 and the circle 3 is the sound source position. If four or more microphones are used, the distance/direction estimator 144 can estimate more precisely including spatial arrangement of the sound source.

The distance/direction estimator 144 estimates, as described above, the position of the sound source of input sound based on a phase difference or volume ratio of input sounds and outputs direction information or distance information of the estimated sound source to the sound estimator 146. Table 1 below lists the input/output of each component of the volume detection unit 130, the sound quality detection unit 138, and the distance/direction estimator 144 described above.

TABLE 1

| Block | Input | Output |
|---|---|---|
| Volume detector | Input sound | Volume value sequence (amplitude) in frame |
| Average volume detector | Volume value sequence (amplitude) in frame | Average value of volume |
| Maximum volume detector | Volume value sequence (amplitude) in frame | Maximum value of volume |
| Spectrum detector | Input sound | Spectrum |
| Sound quality detector | Input sound<br>Average value of volume<br>Maximum value of volume<br>Spectrum | Likeness of human voice<br>Likeness of music<br>Steady or non-steady<br>Impulse property |
| Distance/direction estimator | Input sound<br>Volume value sequence (amplitude) in frame<br>Spectrum | Direction information<br>Distance information |

If sounds originating from a plurality of sound sources are superimposed on an input sound, it is difficult for the distance/direction estimator 144 to precisely estimate the sound source position of a sound predominantly contained in the input sound. However, the distance/direction estimator 144 can estimate a position close to the sound source position of the sound predominantly contained in the input sound. The estimated sound source position may be used as an initial value for sound separation by the sound separation unit 112 and thus, the sound processing apparatus 10 can perform a desired operation even if there is an error in the sound source position estimated by the distance/direction estimator 144.

The description of the configuration of the sound type estimation unit 122 will be resumed with reference to FIG. 4. The sound estimator 146 collectively determines whether any neighborhood sound originating from a specific sound source in the neighborhood of the sound processing apparatus 10 such as a voice of the operator or noise resulting from an operation of the operator is contained in the input sound based on at least one of the volume, sound quality, and positional information of input sound. If the sound estimator 146 determines that a neighborhood sound is contained in the input sound, the sound estimator 146 has a function as a sound determination unit that outputs a message that a neighborhood sound is contained in the input sound (operator voice present information) and positional information estimated by the distance/direction estimator 144 to the sound separation unit 112.

More specifically, if the distance/direction estimator 144 estimates that the position of the sound source of input sound is behind an imaging unit (not shown) imaging video in the imaging direction and the input sound has sound quality that matches or resembles that of human voice, the sound estimator 146 may determine that a neighborhood sound is contained in the input sound.

If the position of the sound source of input sound is behind an imaging unit in the imaging direction and the input sound has sound quality that matches or resembles that of human voice, the sound estimator 146 may determine that the voice of the operator is predominantly contained as a neighborhood sound in the input sound. As a result, a mixed sound in which the sound ratio of the voice of the operator is reduced can be obtained from the sound mixing unit 124 described later.

The sound estimator 146 has the position of the sound source of input sound within the range of a setting distance (neighborhood of the sound processing apparatus 10, for example, within 1 m of the sound processing apparatus 10) from the recording position. If the input sound contains an impulse sound and the input sound is higher than an average volume in the past, the sound estimator 146 may determine that the input sound contains a neighborhood sound caused by a specific sound source. Here, an impulse sound such as "click" and "bang" is frequently caused when the operator of an imaging apparatus operates a button of the imaging apparatus or shifts the imaging apparatus from one hand to the other. Moreover, the impulse sound is caused by an imaging apparatus equipped with the sound processing apparatus 10 and thus, it is highly likely that the impulse sound is recorded at a relatively large volume.

Therefore, the sound estimator 146 has the position of the sound source of input sound within the range of a setting distance from the recording position. If input sound contains an impulse sound and the input sound is higher than an average volume in the past, the input sound can be determined to predominantly contain noise resulting from an operation of the operator as a neighborhood sound. As a result, a mixed sound in which the sound ratio of noise resulting from an operation of the operator is reduced can be obtained from the sound mixing unit 124 described later.

In addition, Table 2 summarizes examples of information input into the sound estimator 146 and determination results of the sound estimator 146 based on the input information. By combining with a proximity sensor, temperature sensor or the like, precision of determination by the sound estimator 146 can be improved.

TABLE 2

| Sound estimator input | | | | | | | | | Determination results | |
|---|---|---|---|---|---|---|---|---|---|---|
| Volume | | | Sound quality | | | | Direction and distance | | | |
| Volume | Average volume | Maximum volume | Likeness of human voice | Likeness of music | Steady or non-steady | Impulse property | Direction | Distance | | |
| High | Higher than average volume in the past | High | High | Low | Non-steady | Normal | Behind main body | Close | Non-steady sound | Operator voice |
| Medium | Comparatively higher than average volume in the past | Medium to high | Normal | Normal | Non-steady | Normal | In front of main body | Close to far | | Object sound |
| High | Higher than average volume in the past | High | Low | Low | Non-steady | High | All directions | Close | Non-steady noise | Operation noise |
| Low | Comparatively lower than average volume in the past | Medium | Low | Low | Non-steady | High | All directions | Far | | Impulsive environmental sound |
| Low | Lower than average volume in the past | Low | Normal | Normal | Steady | Low | Direction unknown | Far | Steady noise | Environmental sound |

Returning to FIG. 1, the mixing ratio calculation unit 120 has a function to calculate the mixing ration of each sound in accordance with the sound type estimated by the sound type estimation unit 122. For example, a mixing ratio that lowers the volume of a dominant sound is calculated using separated sounds separated by the sound separation unit 112, sound type information by the sound type estimation unit 122, and volume information recorded in the recording unit 114.

When the sound type is more steady, a mixing ratio so that volume information does not change significantly between consecutive blocks is also calculated with reference to output information of the sound type estimation unit 122. When the sound type is not steady (non-steady) and noise is more likely, the mixing ratio calculation unit 120 lowers the volume of the sound concerned. On the other hand, if the sound type is non-steady a voice uttered by a person is more likely, the volume of the sound concerned is not much lowered when compared with noise sound.

The sound mixing unit 124 has a function to mix a plurality of sounds separated by the sound separation unit 112 in the mixing ratio provided by the mixing ratio calculation unit 120. For example, the sound mixing unit 124 may mix a neighborhood sound of the sound processing apparatus 10 and a sound to be recorded so that the volume ratio occupied by the neighborhood sound is made lower than that of the neighborhood sound occupied in the input sound. Accordingly, if the volume of neighborhood sound of the input sound is unnecessarily high, a mixed sound in which the volume ratio occupied by the sound to be recorded is increased from that of the sound to be recorded occupied in the input sound can be obtained. As a result, the sound to be recorded can be prevented from being buried by the neighborhood sound.

[3] Operation of the Sound Processing Apparatus

Figure 9:
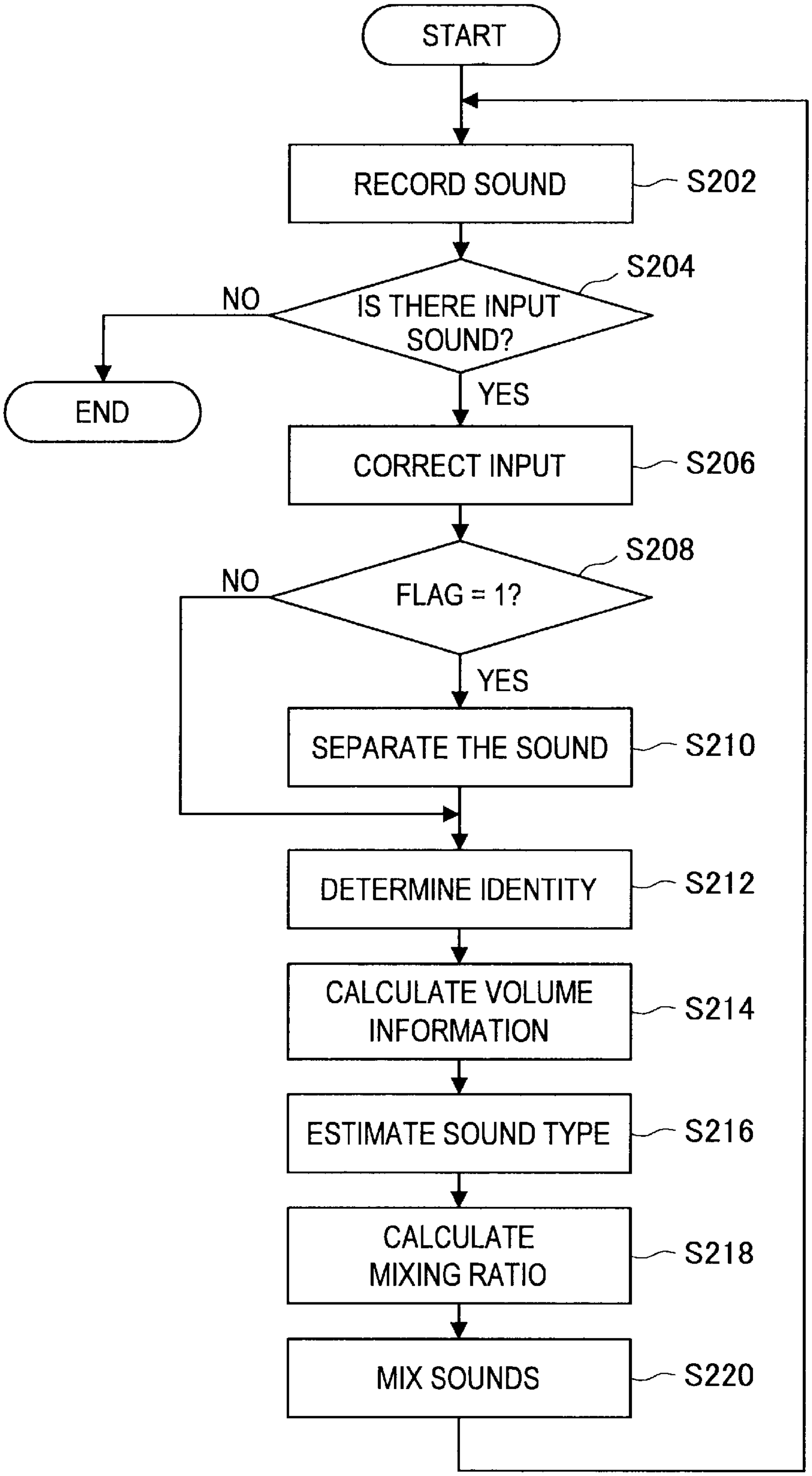
FIG. 9 a flow chart illustrating a sound processing method executed by the sound processing apparatus according to the embodiment.

In the foregoing, the functional configuration of the sound processing apparatus 10 according to the present embodiment has been described. Next, the sound processing method executed by the sound processing apparatus 10 will be described with reference to FIG. 9. FIG. 9 is a flow chart showing the flow of processing of the sound processing method executed by the sound processing apparatus 10 according to the present embodiment. As shown in FIG. 9, first the first sound recording unit 102 of the sound processing apparatus 10 records call voice, which is a first input sound. Also, the second sound recording unit 110 records sound during imaging, which is a second input sound (S202).

Next, it is determined whether the first input sound is input and whether the second input sound is input (S204). If neither first input sound nor second input sound is input, processing is terminated at step S204.

If it is determined at step S204 that the first input sound is input, the input correction unit 104 corrects a difference between characteristics of the first input sound and those of the second input sound (S206). At step S206, the input correction unit 104 sets a flag to an applicable band if adequate characteristics are not obtained as a result of correction or microphone characteristics are originally inadequate (S208).

Next, the sound separation unit 112 determines whether a flag is set to a band of block to be separated (S210). If it is determined at step S210 that a flag is set (flag=1), the sound separation unit 112 separates the input sound. At step S210, the sound separation unit 112 may separate the input sound in units of blocks of a predetermined length. If it is determined at step S210 that a flag is not set (flag=0), processing at step S212 is performed without the input sound being separated.

Then, the identity determination unit 118 determines whether the second input sound separated in units of blocks of a predetermined length at step S210 is identical among a plurality of blocks (S212). The identity determination unit 118 may determine the identity by using the distribution of amplitude information, volume, direction information and the like at discrete times of sounds in units of blocks separated at step S210.

Next, the sound type estimation unit 122 calculates volume information of each block (S214) to estimate the sound type of each block (S216). At step S216, the sound type estimation unit 122 separates the sound into a voice uttered by the operator, sound caused by an object, noise resulting from an operation of the operator, impulse sound, steady environmental sound and the like.

Next, the mixing ratio calculation unit 120 calculates a mixing ratio of each sound in accordance with the sound type estimated at step S216 (S218). The mixing ratio calculation unit 120 calculates a mixing ratio that reduces the volume of a dominant sound based on volume information calculated at step S214 and sound type information calculated at step S216.

Then, the plurality of sounds separated at step S210 is mixed using the mixing ratio of each sound calculated at step S218 (S220). In the foregoing, the sound separation method executed by the sound processing apparatus 10 has been described.

According to the above embodiment, as described above, a difference between characteristics of the first input sound input from a call microphone of the sound processing apparatus 10 and those of the second input sound input from an imaging microphone is corrected. The first input sound whose input is corrected and the second input sound are separated into sounds originating from a plurality of sound sources and a plurality of separated sound types is estimated. Then, a mixing ratio of each sound is calculated in accordance with the estimated sound type and each separated sound is remixed in the mixing ratio. Then, a call voice is extracted from the first input sound whose characteristics have been corrected using a mixed sound after being remixed.

Accordingly, a mixed sound originating from various sound sources can be separated before being remixed in a desired ratio by utilizing the call microphone as an imaging microphone. Moreover, sound recorded in various situations by additionally using the call microphone in addition to the imaging microphone during imaging by the sound processing apparatus 10 equipped with an imaging apparatus can comfortably be heard continuously without any volume operation by the user. Moreover, the volume of main individual sound sources can independently be adjusted during recording. Further, by additionally using the call microphone during imaging, a desired sound of sounds recorded by a recording application can be prevented from being disabled after a desired call voice is made harder to hear by being masked by a sound whose volume is higher than that of the desired sound. Also, individual sound sources can be extracted from a mixed sound of a plurality of sound sources with a smaller number of microphones than before being remixed automatically at volumes desired by the user.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-283069 filed in the Japan Patent Office on Nov. 4, 2008, the entire content of which is hereby incorporated by reference.

What is claimed is:

1. A sound processing apparatus, comprising:
- an input correction unit that corrects a difference between characteristics of a first input sound input from a first input apparatus and characteristics of a second input sound input from a second input apparatus that are different from the characteristics of the first input sound, wherein the input correction unit corrects a difference in sampling frequency between the first input sound input and the second input sound input;
- a sound separation unit that separates the first input sound corrected by the input correction unit and the second input sound into a plurality of sounds;
- a sound type estimation unit that estimates sound types of the plurality of sounds separated by the sound separation unit;
- a mixing ratio calculation unit that calculates a mixing ratio of each sound in accordance with the sound type estimated by the sound type estimation unit; and
- a sound mixing unit that mixes the plurality of sounds separated by the sound separation unit in the mixing ratio calculated by the mixing ratio calculation unit.

2. The sound processing apparatus according to claim 1, wherein the first input apparatus is a call microphone used when a call is made and the second input apparatus is an imaging microphone used during an imaging process.

3. The sound processing apparatus according to claim 2, wherein the input correction unit sets a flag to a band where characteristics of the call microphone, the imaging microphone, or a combination thereof are inadequate, and
- the sound separation unit does not separate the sound of the band to which the flag is set by the input correction unit.

4. The sound processing apparatus according to claim 1, wherein the input correction unit corrects a dynamic range of the first input sound, the second input sound, or a combination thereof.

5. The sound processing apparatus according to claim 1, wherein the input correction unit performs sampling rate conversions of the first input sound, the second input sound, or a combination thereof.

6. The sound processing apparatus according to claim 1, wherein the input correction unit corrects a difference of delay between the first input sound and the second input sound due to A/D conversions.

7. The sound processing apparatus according to claim 1, wherein
- the sound separation unit separates the input sound into a plurality of sounds in units of blocks, and comprises:
  - an identity determination unit that determines whether the sounds separated by the sound separation unit are identical among a plurality of blocks; and
  - a recording unit that records the sounds separated by the sound separation unit in units of blocks.

8. The sound processing apparatus according to claim 1, wherein the sound separation unit separates the input sound into a plurality of sounds using statistical independence of sound and differences in spatial transfer characteristics.

9. The sound processing apparatus according to claim 1, wherein the sound separation unit separates the input sound into a sound originating from a specific sound source and other sounds using a paucity of overlapping between time-frequency components of sound sources.

10. The sound processing apparatus according to claim 1, wherein the sound type estimation unit estimates whether the input sound is a steady sound or non-steady sound using a distribution of one of amplitude information, direction, volume, and zero crossing number at discrete times of the input sound.

11. The sound processing apparatus according to claim 10, wherein the sound type estimation unit estimates whether the sound estimated to be a non-steady sound is a noise sound or a voice uttered by a person.

12. The sound processing apparatus according to claim 10, wherein the mixing ratio calculation unit calculates a mixing ratio that does not significantly change the volume of the sound estimated to be a steady sound by the sound type estimation unit.

13. The sound processing apparatus according to claim 11, wherein the mixing ratio calculation unit calculates a mixing ratio that lowers the volume of the sound estimated to be a noise sound by the sound type estimation unit and does not lower the volume of the sound estimated to be a voice uttered by a person.

14. A sound processing method, comprising the steps of:

correcting a difference between characteristics of a first input sound input from a first input apparatus and characteristics of a second input sound input from a second input apparatus that are different from the characteristics of the first input sound, wherein the correcting comprising a correction of a difference in sampling frequency between the first input sound input and the second input sound input;

separating the corrected first input sound and the second input sound into a plurality of sounds;

estimating sound types of the plurality of separated sounds;

calculating a mixing ratio of each sound in accordance with the estimated sound type; and mixing the plurality of separated sounds in the calculated mixing ratio.

* * * * *